Oct. 12, 1971     F. LISSAU     3,611,811
DIFFERENTIAL DENSITY MANOMETER
Filed March 27, 1970
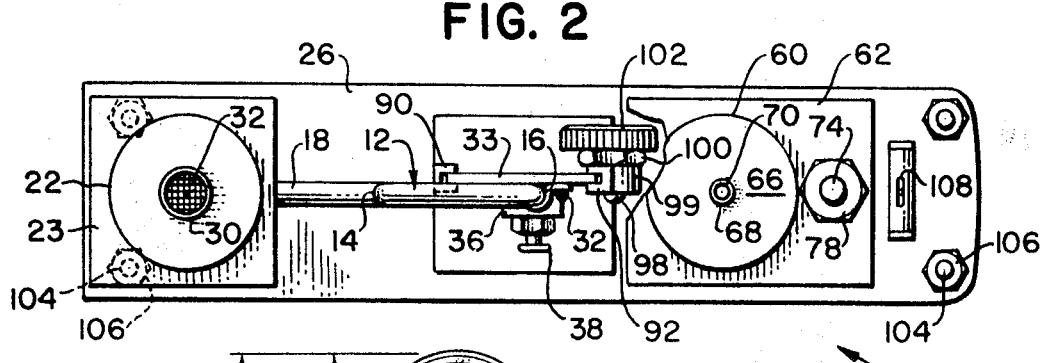
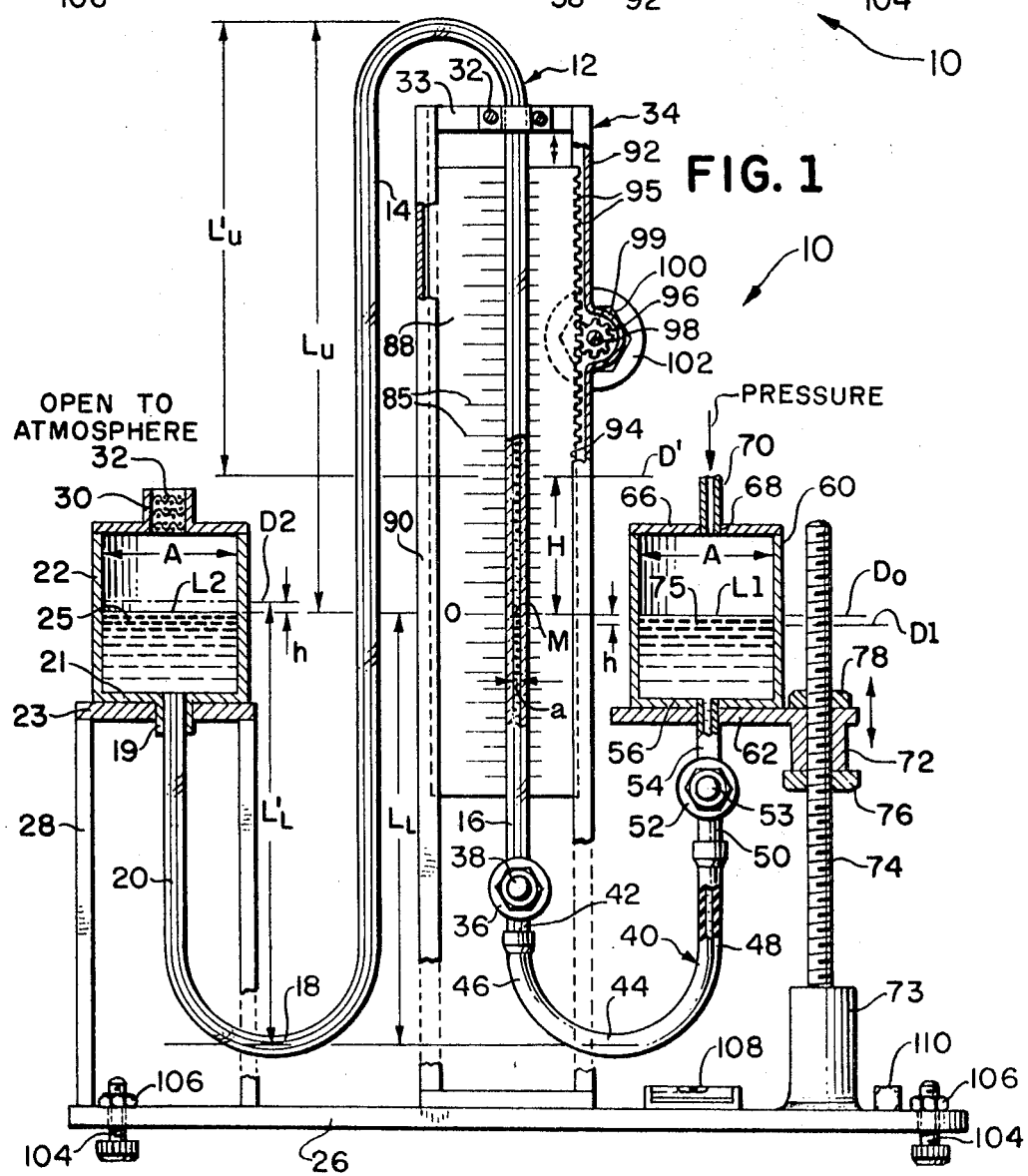
INVENTOR:
F. LISSAU
BY J. B. Burke
ATTORNEY.

United States Patent Office 3,611,811
Patented Oct. 12, 1971

3,611,811
DIFFERENTIAL DENSITY MANOMETER
Frederic Lissau, Forest Hills, N.Y., assignor to
Liquidonics, Inc., Westbury, N.Y.
Filed Mar. 27, 1970, Ser. No. 23,367
Int. Cl. G01l 7/18
U.S. Cl. 73—401                          10 Claims

ABSTRACT OF THE DISCLOSURE

A manometer for accurately measuring extremely small changes in fluid pressures employs an inverted vertical U-shaped tube assembly having a narrow uniform bore throughout its length. Two upwardly turned leg portions are connected to two containers of equal size containing two fluids of different colors and densities. The fluids fill the tube and meet at a meniscus whose position in the tube is read on a graduated scale adjacent to the transparent tube. The scale is adjustably movable along the tube. The height of one container is also adjustable. Either one of the containers may be open to the atmosphere while the other container is open to a source of variable pressure. Any change in the variable pressure produces a change in scale reading. The distance the meniscus moves upon a change in pressure depends on the ratio of densities and ratio of cross sectional area of one container to the cross sectional area of the bore of the tube.

---

This invention concerns a differential density manometer capable of measuring extremely low pressures or pressure differentials.

Primary pressure measurements are made by converting gravimetric forces to pressure readings. Manometers usually measure pressure by displacement of a column of fluid in a vertical readout tube. The column height or head, depending on the density of fluid, is a direct measure of pressure sustaining the column. The conventional manometer is limited at the low end of the measurable pressure range by the minimum amount of fluid displacement which can practically be read on the readout tube.

The present invention provides a manometer adapted to measure very low pressures in the range of 0.00001 to 0.01 p.s.i. (pounds per square inch), in which range conventional manometers are generally inoperable. According to the invention, the present manometer employs an inverted vertical U-tube assembly having turned up end leg portions connected to identical cylindrical containers each containing a differently colored fluid. Pressure to be measured is applied at a pressure port in one container. The other container is open to atmospheric pressure. Any change in pressure applied at the pressure port is read on the U-shaped tube as a change in level of the meniscus where the two fluids meet in the tube. This change in level or pressure head depends on the difference between the densities of the two fluids. This difference ratio can be made quite small, so that the lowest readable differential pressure will be very small. Due to the gravimetric principle employed, primary, reliable, precise readings as low as 0.00001 p.s.i. are obtainable.

The construction and mode of operation of the differential density manometer will be explained in further detail in connection with the drawing, wherein:

FIG. 1 shows a differential density manometer in vertical elevational view, parts of the manometer are shown in vertical section.

FIG. 2 is a top plan view of the manometer of FIG. 1.

Referring to the drawing, the manometer 10 includes an inverted U-shaped transparent tube 12 having its bight at the top, and two spaced parallel vertical legs 14, 16. One leg 14 is turned up to define a bottom bend 18 and vertical short lower leg portion 20. This end leg portion is secured to fitting 19 at the bottom 21 of an axially cylindrical container 22 of fluid 25. The container rests on horizontal platform 23 supported by legs 28 upon a base plate or platform 26. The upper end of the container has a cylindrical port 30 open to the atmosphere. An air filter 32 is fitted in port 30.

The other leg 16 of tube 12 is secured in a clamp 32 to crossbar 33 at the top of a rectangular frame 34. A manually operable valve 36 having a control knob or handle 38 is secured at the lower end of leg 16. A flexible tube 40 is secured at one end to fitting 42 extending down from valve 36. Tube 40 is arranged in a U-shaped configuration like leg portion 20 and bottom bend 18. Tube 40 has a lower bend 44 and lateral vertical legs 46, 48. Leg 46 is attached to fitting 42. Leg 48 is secured to fitting 50 extending downwardly from a manually operable valve 52 having a control knob 53. Nipple 54 extends vertically downward from the bottom 56 of another cylindrical container 60. Tube 40 in effect constitutes a contiuation of leg 16. Tubes 12 and 40 are disposed in a single vertical plane. This tube assembly has a uniform, fine narrow bore "$a$" which extends from end to end thereof.

Container 60 is axially vertical and is supported on a horizontal platform 62. The internal cross sectional areas A of the two containers 22 and 60 are equal. At the top 66 of container 60 is a port 68 in which is a conduit 70. A gas under pressure to be measured is applied via conduit 70 to the top of fluid 75 in container 60. Platform 62 is adjustable in height with respect to platform 26 by means of a sleeve 72 slidably disposed on a threaded post 74. The post is axially vertical and is secured in a boss 73. Nuts 76 and 78 below sleeve 72 and on top of platform 62 respectively lock the platform in place on the post. By this means the container 60 can be adjustably raised and lowered. The two fluids 25 and 75 have different colors, fluid 25 being light colored and fluid 75 being dark colored, for example, or vice versa. The fluids have different densities so they are not mutually miscible, and meet at a meniscus M shown at level "0" on scale 85.

The scale 85 comprises graduated lines on a vertical plate 88. The plate is slidable vertically between vertical channel bars 90, 92 forming part of frame 34. The lower ends of the bars are secured to a base plate 93 mounted in a stationary position on platform 26.

Edge 94 of plate 88 is formed with rack teeth 95 engaged by a spur gear 96 supported on a shaft 98 and carried by lateral extension 99 of the frame. A nut 100 on shaft 98 locks the shaft and gear in a stationary nonrotatable position to hold the plate in a fixed position. A knob 102 rotates the gear when nut 100 is loosened. By this arrangement the scale reading "0" can be set exactly at meniscus M in leg 16 of the tube.

The platform 26 can be leveled by means of leveling screws 104 provided with locknuts 106. Mutually perpendicular horizontal spirit levels 108 and 110 on the platform serve as guides when the platform is level to insure that tube 12 is vertical in mutually perpendicular vertical planes.

The fluid in closed container 60 can be inserted via tube 40. To do this, tube 40 can be detached from nipple 42. Valves 36 and 52 will be closed. A fluid supply will then be coupled to tube 44 and valve 52 will be opened to fill the container. After the container is filled, valve 52 will be closed and tube 40 will be reattached to nipple 42. Valves 36 and 52 can then be opened. Container 22 can be filled via port 30.

In operation of the manometer, the fluid level $L_1$ of fluid 75 in container 60 is initially in balance with the fluid in leg 16 since level $L_1$ is at the same datum level $D_0$ as meniscus M where scale 85 reads "0" as shown in FIG. 1. The level $L_2$ of fluid 25 in container 22 is also in balance at datum level $D_0$. Fluid 25 in the lower portion of leg 14 below level $D_0$ is balanced in distance $L_L$ with the fluid in leg 20 and container 22. Fluid 25 in the upper portion of leg 14 above level $D_0$ is balanced in distance $L_U$ with the same fluid in the upper portion of leg 16.

The pressure to be measured is applied at pressure port 68 via gas conduit 70. The level of meniscus M will rise from level $D_0$ a distance H. At the same time the level $L_1$ of fluid in container 60 will fall a distance $h$, so that the new height D' of the dark fluid column above reading "0" will be $H+h$. This establishes a new datum line or level $D_1$ for the top of fluid 75 in container 60. The light colored, less dense fluid 25 will now be balanced in distance $L'_U$ in the upper portions of legs 14 and 16 while the fluid in the lower portion of leg 14 will be in balance with fluid in leg 20 and container 22 in the distance $L'_L$. The fluid in container 22 will be at a new higher level $D_2$. It will be apparent that the height of fluid column between levels D' and $D_2$ will be equal to $H-h$. This column acts negatively or downward to increase the deflection or rise of dark fluid 75 in leg 16. It is this effect which makes it possible for very minute changes in applied pressure to produce very large changes in fluid level in tube 12, which level changes are read easily on scale 85. The pressure head H can be expressed by the following equation:

$$H = \frac{P}{S_1\left(1+\frac{1}{n}\right) - S_2\left(1-\frac{1}{n}\right)}$$

where:

H = the pressure head in the tube caused by change in pressure;
P = the pressure change to be measured;
$S_1$ = the density of fluid 75;
$S_2$ = the density of fluid 25; and
$n$ = the ratio of the large cross sectional area A of each container to the small cross sectional area "$a$" of the bore of tube 12.

H will be proportional to the pressure change to be measured since $S_1$, $S_2$ and $n$ are constants. The above equation shows that the fluid combination 25, 75 behaves almost exactly like a single fluid having a density $S_1-S_2$ because the ratio $1/n$ can be made so small as to be negligible in the equation. This is done by making the area A very much larger than area "$a$."

The equation is valid for any arbitrarily chosen datum level $D_0$. This level can be varied at will by adjusting the height of container 60. Plate 88 will be adjusted in position correspondingly to set level $D_0$ at the "0" reading on scale 85. The manometer can accurately measure pressure changes as small as 0.00001 p.s.i.

The manometer can be used to measure absolute pressures if container 22 is evacuated of air through port 30 to reduce the pressure in container 22 to zero. The manometer can be used as a differential pressure gauge to measure the difference in pressure between that applied to container 60 via port 70 and any other pressure applied to container 22 via port 30.

The mechanical features shown in FIGS. 1 and 2 are only exemplary of the invention. Modifications are possible. For example, the legs 14 and 16 of tube 12 need not be vertical. They can be tilted provided they remain in the same vertical plane. Other equivalent means can be used for varying the height of the scale and levels of the containers, for fluid filling means, for tube support, etc.

What is claimed is:

1. A differential density manometer for measuring extremely low changes in pressure in a fluid, comprising an inverted U-shaped tube assembly having a bore of uniform cross sectional area in a reading range, said tube assembly having a bight at the top thereof, two transparent legs, and two end leg portions turned upwardly and communicating with said legs; a pair of axially vertical containers supported above said end leg portions for respectively containing fluids of two different densities and colors, said fluids filling said tube assembly and meeting at a meniscus point in one of said legs; means connecting ends of the turned up leg portions to the containers for passing the fluids into and out of the containers; and a graduated scale disposed adjacent to the legs for reading any change in position of said meniscus when a pressure differential is applied to the fluid in one of the containers, said containers having identical internal cross sectional areas, so that the change in differential pressure relative to both containers is manifested by a change in position of said meniscus in said tube at said scale, said change in position being a measure of the pressure head in the tube caused by said change in differential pressure and depending in magnitude on the difference in densities of the two fluids.

2. A differential density manometer as defined in claim 1, wherein said pressure head caused by said change in applied differential pressure is expressable quantitively as follows:

$$H = \frac{P}{S_1\left(1+\frac{1}{n}\right) - S_2\left(1-\frac{1}{n}\right)}$$

where:

H — the pressure head caused by said change in applied pressure;
P = the pressure change to be measured;
$S_1$ = the density of one of the two fluids;
$S_2$ = the density of the other of the two fluids; and
$n$ = the ratio of cross sectional areas of one container to the cross sectional area of said bore.

3. A differential density manometer as defined in claim 2, wherein said scale has a zero datum level indication thereon, and further comprising means for adjustably elevating said scale at said tube assembly to position said zero datum level indication at said meniscus point where the two fluids meet in the tube.

4. A differential density manometer as defined in claim 3, further comprising means for adjustably elevating either one of the two containers for adjustably positioning said meniscus point in said tube assembly.

5. A differential density manometer as defined in claim 4, further comprising means for removing fluid from and adding fluid to said one container.

6. A differential density manometer as defined in claim 2, wherein said legs of the tube assembly are disposed in a single vertical plane; and further comprising means for supporting said tube assembly; and means for leveling the support means in mutually perpendicular vertical planes respectively parallel and perpendicular to the vertical plane of the tube assembly.

7. A differential density manometer as defined in claim 6, wherein said scale has a zero datum level indication thereon; and further comprising means carried by said support means for adjustably elevating said scale at said tube assembly to position said zero datum level indication at said meniscus point.

8. A differential density manometer as defined in claim 7, further comprising means carried by said support means for adjustably elevating either of the two containers for adjustably positioning said meniscus point in the tube assembly.

9. A differential density manometer as defined in claim 8, wherein one of the leg portions of the tube assembly connected to said one container comprises a flexible section to permit adjustable elevation of said one container with respect to the other container.

10. A differential density manometer as defined in claim 9, further comprising valve controlled means interposed between said tube assembly and said one container for adjustably removing fluid from and adding fluid to said one container.

References Cited

UNITED STATES PATENTS 3,134,262   5/1964   Dworzan et al. _____ 73—401

DONALD O. WOODIEL, Primary Examiner